Nov. 15, 1966  G. E. POWER ETAL  3,286,008
METHOD OF MOLDING INTRACTABLE POLYMERS
Filed May 17, 1965
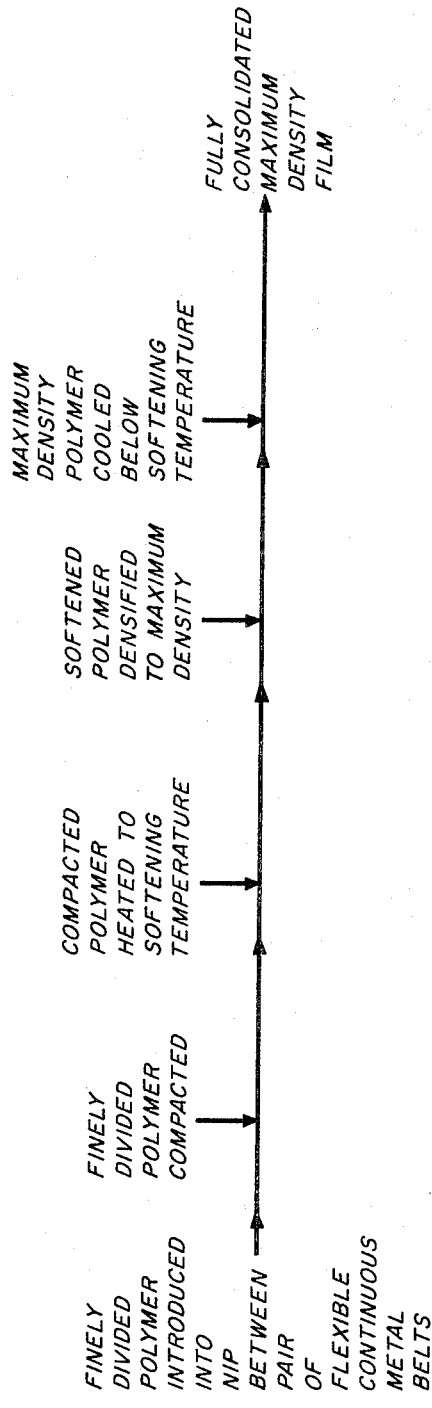
INVENTORS
GEORGE EDWARD POWER
KENNETH DONALD MEYERS
ROBERT EMIL FREMONT 3,286,008
METHOD OF MOLDING INTRACTABLE POLYMERS
George Edward Power, Kenneth Donald Meyers, and Robert Emil Fremont, Cincinnati, Ohio, assignors to Formica Corporation, Cincinnati, Ohio, a corporation of Delaware
Filed May 17, 1965, Ser. No. 456,502
10 Claims. (Cl. 264—126)

This invention relates to a continuous method for making a plastic sheet from intractable polymers or heat sensitive polymers. More particularly, this invention relates to a method for preparing a plastic sheet from such polymeric materials in which the polymeric material is introduced into the nip between a pair of flexible continuous metal belts and heating the material at a temperature between the softening temperature and the melting temperature of the polymeric material thereafter densifying the softened material followed by cooling. Still further, this invention relates to the product produced according to the process of the present invention.

One of the objects of the present invention is to produce a plastic sheet from an intractable polymeric material or a heat sensitive polymeric material. A further object of the present invention is to produce by a continuous process a plastic sheet from such polymeric materials in which a pseudo extrusion technique is utilized. These and other objects of the present invention will be discussed in greater detail hereinbelow.

Reference is made to the accompanying flowsheet which is deemed to be self-explanatory.

Intractable organic polymeric materials are exceedingly viscous even when heated above their softening temperature and melting point. These intractable polymeric materials have such a low melting index that by presently known techniques it is virtually impossible to extrude the polymeric material into a sheet form, which extruding technique can readily be accomplished on other polymeric materials which have significantly higher melt indices. The melting index referred to hereinabove is described in greater detail in the ASTM Bulletin D1238. Among the intractable polymers which may be processed in accordance with the concept of the present invention are high molecular weight organic polymers having a low melt index, such as certain polyethylene polymers and copolymers, poly(tetrafluoroethylene), polyvinylidene fluoride, rigid polyvinyl chloride, polypropylene, polycarbonate, brominated polycarbonate, poly(methyl-2-fluoromethyl)-acrylate, high molecular weight (over 1,000,000) polymethyl methacrylate, and the like. Some of these thermoplastic low melt index polymeric materials have a molecular weight of 100,000, 150,000, 200,000, and especially, 1,000,000, 1,500,000, 4,000,000 and 6,000,000, and higher. These high molecular weights may be determined by the light scattering method as outlined in the "Principles of Polymer Chemistry," P. J. Flory, Cornell University Press, 1953, pages 256–316. These molecular weight determinations by the light scattering method are generally referred to as weight average molecular weights.

Another class of polymeric materials which can be utilized in the process of the present invention are those which although not classed as intractable are nevertheless heat sensitive and, as a consequence, efforts to extrude such heat sensitive materials have not proven to be satisfactory because the source of extrudable material is held at the softening temperature for extrusion purposes in a given container, which elevated temperatures cause the polymeric material to undergo a measure of degradation thereby rendering the resultant extruded sheet worthless. Included in this group of the heat sensitive polymeric materials are light stabilized polyvinyl chloride, polyvinyl dichloride, and the like. Many of the polymeric materials which are used in the process of the present invention are available commercially in various finely-divided forms, such as powder, granules, pellets, and the like. If the particle size of the polymeric material is too large for processing between the nip of the pair of continuous metal belts used in the practice of the process of the present invention, they may be reduced in size to whatever particle size is desired.

Another feature of the present invention resides in the fact that these intractable or heat sensitive polymeric materials can be molded or fused into a continuous sheet without subjecting the polymeric materials to high shearing (intense mixing), which in certain instances, results in degradation of the polymeric materials by breakdown of the molecular weight.

The polymeric material of either class is processed by rapidly heating a supply of the finely-divided polymeric material to a temperature at or above the softening temperature and sometimes above the melting temperature of the polymeric material between the pair of belts and as the belts move closer to one another in the densifying zone, there is accomplished a densification of the polymeric material thereby forming a sheet, the densified material is cooled to a temperature not significantly below the softening temperature of the polymeric material, thereafter the fused or molded polymer is removed from the space between the moving belts. The fused sheet is further cooled to room temperature by simply exposing it to the atmosphere. The amount of time required for a given group of particles to pass through the steps of the process will vary between about 2 seconds and 20 seconds depending primarily on the melt index of the polymeric material, the thickness of the fused sheet, and also depending on whether or not any preheating activity is engaged in before introducing the polymeric material into the nip. The gap between the two continuous belts can be adjusted to any given size depending on the thickness of the sheet ultimately desired and may be varied from a few mils to 250 mils, or even more. The gaps between the belts at the nip and in the densifying zone are preset with the thickness of the ultimate sheet in mind. When the sheet has been fully densified and fused, it is cooled and stripped from between the belts.

If it is desired to reinforce the sheets of polymeric materials produced by the process of the present invention, one may use such reinforcing media as paper webs, fabrics of natural, synthetic, or glass fibers, asbestos fibers, metal foils, and the like. In utilizing such reinforcing materials, one may introduce the reinforced sheet between the pair of endless metal belts and superimposed thereon the polymeric material to be sheeted. Alternatively, you may introduce the reinforced web between two or more sources of the polymeric material to be treated thereby producing a pseudo extruded sheet having the reinforced member as the core. Still further, one may make a sandwich with the web on the upper and lower surfaces with the polymeric material in between.

A suitable device for use in the practice of the process of the present invention is described in United States Patent 3,159,526, which patent is incorporated herein by reference.

In order that the concept of the present invention may be more completely understood, the following examples are set forth. These examples are set forth primarily for the purpose of illustration and any specific enumeration of detail contained therein should not be interpreted as a limitation on the case except as is indicated in the appended claims.

*Example 1*

A commercially available polyethene powder having the following properties is fed to the nip formed by the parallel moving belts of a machine described in the aforementioned patent.

| | |
|---|---|
| Mesh size | From 60 to 100 mesh. |
| Bulk polymer density | 200–350 g./liter. |
| Melting point | 266–268° F. |
| Melt flow | Less than 0.01 g. in 10 min. using apparatus of ASTM D–1238 with 5 kg. load at 250° C. |
| Density | 0.94 on compression molded pieces. |
| Intrinsic viscosity | 17.7 (avg. molecular weight: $4 \times 10^6$). |

The powder is fed from a hopper as a free flowing material and forced into the opening between the belts by the friction action of the belts and the weight of the material. The initial gap opening between the belts is approximately 1.8 times the gap between the belts at the orifice in the densifying section which is set for the thickness desired in the finished piece. For a sheet of about 0.050" thickness, the initial gap is, therefore, about 0.090".

The material is heated to a rubbery or viscous liquid state in the first heating zone by passing the belts between platens that are at 477° F. in the initial gap area and at 469° F. in the orifice area. While still held between the belts and at the same gap setting as in the densifier zone, the material is cooled by contacting the belts with platens that are chilled so that the now fully densified material is readily stripped from between the belts. The belts move past the heating and cooling platens at a rate of 10 f.p.m. for the 0.050" molding. The heating time in the initial gap section is about one second and in the densifying section about three seconds, and the cooling is accomplished in about four seconds. The finished molded piece has a uniform appearance with semi-glossy surfaces, is flexible, tough and exceedingly difficult to scratch or gouge. The sheet thus produced has the typical waxy feel of polyethylene. The following properties were measured:

| | |
|---|---|
| Density | .94 average. |
| Hardness | 62–64 Shore A. |
| Intrinsic viscosity | 12.5 (avg. molecular weight: $2.4 \times 10^6$). |

*Example 2*

A commercially available, high density linear polyethylene powder was used in the manner of Example 1 which had the following properties:

| | |
|---|---|
| Density | 0.94 on compression molded piece. |
| Melt flow | Nil — ASTM D–1238. |
| Mesh size | From 60 to 200 mesh screens. |
| Melt point | 135° C. |
| Intrinsic viscosity | 15.0. |

Press conditions were:
    Initial gap and temperature __ .090"–477° F.
    Orifice gap and temperature _ .050"–469° F.
Residence times:
    1 second/initial.
    3 seconds/orifice.
    4 seconds/cooling.

The finished product is smooth, uniform, tough and has a density of about 0.94 and a hardness of 62–64 Shore A, and thickness of 0.050".

*Example 3*

A commercially available, high density linear polyethylene crumb is used having the following properties:

| | |
|---|---|
| Melt index | 1.4 at 22#/10 min./190° C. |
| Melt point | 138–152° C. |
| Mesh size | From 0.060" diam. to 200 mesh screen. |
| Intrinsic viscosity | 6.1. |

This material is spread onto a textured metal carrier shim in a uniform thickness of about 0.125" and the carrier shim had a thickness of about 0.010". The crumb was passed through the press under the following conditions:

Initial gap and temperature _____ 0.076"–445° F.
Orifice gap and temperature _____ 0.060"–454° F.
Residence time:
    1.25 seconds.
    3.75 seconds.
    5.0 seconds.

After leaving the press, the polyethylene sheet is stripped from the shim. The sheet has a smooth, uniform appearance on the surfaced pressed against the moving belt and the textured appearance of the shim on the reverse surface. The thickness of the sheet thus produced was about 0.050" and had a hardness of 64–68 Shore A. The sheets produced according to Examples 1, 2 and 3 were excellent for use as ski soles.

*Example 4*

The polyethylene crumb of Example 3 is distributed over a 6 oz. canvas to a depth of 0.100". The canvas and the crumb are fed between the belts of the press. The process conditions are as follows:

Initial gap and temperature _____ 0.068"–392° F.
Orifice gap and temperature _____ 0.052"–388° F.
Residence time:
    1.1 seconds.
    3.3 seconds.
    4.5 seconds.

The finished product is a canvas-backed polyethylene sheet with good bond between the canvas and the polymer and is also useful for ski soles.

*Example 5*

The polyethylene of Example 3 is distributed on a 1 oz. copper foil in the same manner as in Example 3 to a thickness of about 0.125". A second 1 oz. copper foil is placed over the top and the assembly is passed through the press. The press conditions are as follows:

Initial gap and temperature _____ 0.076"–433° F.
Orifice gap and temperature _____ 0.060"–426° F.
Residence time:
    0.83 second.
    2.5 seconds.
    3.3 seconds.

After leaving the press, the copper-clad laminate structure is complete. The copper foils used were uninhibited on one side with the uninhibited side in contact with the polyethylene. The properties of the ultimate laminate are as follows:

| | |
|---|---|
| Thickness | 0.060". |
| Water absorption | <0.06% (Condition A). |
| Copper bond | 6 lbs./inch—90° peel. |
| Power factor | Cond. A and D48/50 ≦0.00022. |
| Dielectric constant (D.K.) | Cond. A and D48/50— ≦2.57. |
| ¹ Dielectric storage | 900–1200 v.p.m. |

Example 6

A commercially available polyacrylonitrile fiber staple type 61–3 denier is distributed, 1 lb. per 2.5 sq. ft., over a smooth 0.002″ carrier sheet and covered with a 0.002″ shim. The assembly is passed through the press under the following conditions:

Initial gap and temperature _____ 0.082″–445° F.
Orifice gap and temperature _____ 0.066″–454° F.
Residence time:
    3.75 seconds.
    11.25 seconds.
    15.00 seconds.

The product produced is a clear, brittle sheet.

Example 7

Poly (methyl methacrylate) particles are produced by chopping sheets of cast poly (methyl methacrylate). The particles were processed as in Example 1. Particle properties were:

Softening point _____ 320° F.
Discoloration point _____ 356° F.
Melt point _____ 518° F.
Particle size _____ 3/16″ to 200 mesh.
Molecular weight _____ About 1,000,000.
Press conditions were:
    Initial gap and temperature _____ 0.068″–425° F.
    Orifice gap and temperature _____ 0.060″–425° F.
    Residence time:
        5 seconds.
        15 seconds,
        20 seconds.

The finished product was a clear, non-discolored transparent sheet having smooth surfaces and a hammered glass appearance where groups of large particles had been present. Where the sheet was formed from smaller particles, the appearance was the same as that of a cast sheet.

Example 8

Poly (methyl methacrylate) beads cross-linked with ethylene glycol dimethacrylate are fed to the nip formed by the belts of the press in a manner as described in Example 1 under the following conditions:

Initial gap and temperature _____ 0.092″–477° F.
Orifice gap and temperature _____ 0.052″–469° F.
Residence time:
    1.25 seconds.
    3.75 seconds.
    5.00 seconds.

The product produced was a clear, transparent, hard, brittle sheet.

Example 9

A commercially available rigid polyvinyl chloride in the form of cubes of approximately 1/8″ per side is fed into the press in the manner described in Example 1 under the following conditions:

Initial gap and temperature _____ 0.150″–492° F.
Orifice gap and temperature _____ 0.050″–484° F.
Residence time:
    2.5 seconds.
    7.5 seconds.
    10.0 seconds.

The product thus produced is a tough, homogeneous sheet of uniform appearance having a thickness of 0.050″.

Example 10

A polyimide polymer having a melting point of 563° F. is dissolved in a mixture of dimenthylformamide and methylethyl ketone solvent. The resulting solution is used to impregnate glass fabric to a resin content of about 20% and then dried. The impregnated sheets are arranged in a stack of 8 layers and enclosed in an envelope of aluminum foil. This assembly is then fed to the press under the following conditions:

Initial gap and temperature _____ 0.090″–492° F.
Orifice gap and temperature _____ 0.050″–484° F.
Residence time:
    5.00 seconds.
    15.0 seconds.
    20.0 seconds.

The product after removal of the envelope was a sheet of laminate having an approximate thickness of 0.050″, of uniform appearance and smooth surfaces. The interlaminar bond was good.

We claim:

1. A continuous method for making a fully consolidated, maximum density, plastic sheet comprising continuously introducing a non-sintered finely-divided polymeric thermoplastic material selected from the group consisting of intractable polymers and heat sensitive polymers into the nip between a pair of flexible continuous metal belts, heating the material at least to the softening temperature of said polymeric material in a first heating zone, continuously moving the heated material to a second zone while densifying the material, cooling the material in the densified state to a temperature below the softening temperature of the polymeric material, while continuously removing the densified material from the densifying zone and cooling the sheet thus produced to room temperature wherein said intractable polymers have a molecular weight of at least about 100,000 and a melt index not exceeding about 1.4 at 22 lbs./10 min. at 190° C. and wherein said heat sensitive polymers undergo an irreversible measure of degradation of at least one of their physical properties when subjected to at least their softening temperatures for a prolonged period of time.

2. A continuous method for making a fully consolidated, maximum density, plastic sheet comprising continuously introducing a non-sintered finely-divided thermoplastic intractable polymeric material into the nip between a pair of flexible continuous metal belts, heating the material at least to the softening temperature of said polymeric material in a first heating zone, continuously moving the heated material to a second zone while densifying the material, cooling the material in the densified state to a temperature below the softening temperature of the polymeric material, while continuously removing the densified material from the densifying zone and cooling the sheet thus produced to room temperature wherein said intractable polymeric material has a molecular weight of at least about 100,000 and a melt index not exceeding about 1.4 at 22 lbs./10 min. at 190° C.

3. A continuous method for making a fully consolidated, maximum density, plastic sheet comprising continuously introducing a non-sintered finely-divided heat sensitive thermoplastic material into the nip between a pair of flexible continuous metal belts, heating the material at least to the softening temperature of said polymeric material in a first heating zone, continuously moving the heated material to a second zone while densifying the material, cooling the material in the densified state to a temperature below the softening temperature of the polymeric material, while continuously removing the densified material from the densifying zone and cooling the sheet thus produced to room temperature wherein said heat sensitive thermoplastic material undergoes an irreversible measure of degradation of at least one of its physical properties when subjected to at least its softening temperature for a prolonged period of time.

4. The process according to claim 2 in which the thermoplastic intractable polymeric material is polyethylene.

5. The process according to claim 2 in which the thermoplastic polymeric material is polypropylene.

6. The process according to claim 3 in which the heat sensitive thermoplastic material is polyvinyl chloride.

7. The process according to claim 2 in which the thermoplastic intractable polymeric material is a rigid polyvinyl chloride.

8. The process according to claim 2 in which the thermoplastic intractable polymeric material is a high mol weight poly (methyl methacrylate).

9. The process according to claim 2 in which the thermoplastic intractable polymeric material is a polyimide.

10. The process according to claim 2 in which the thermoplastic intractable polymeric material is polyacrylonitrile.

References Cited by the Examiner

UNITED STATES PATENTS

| | | | |
|---|---|---|---|
| 2,788,838 | 4/1957 | Crabbe | 264—313 |
| 2,960,727 | 11/1960 | Bradshaw | 264—126 |
| 3,007,207 | 11/1961 | Sautofer | 264—175 |
| 3,010,950 | 11/1961 | Thomas | 264—94 |
| 3,013,003 | 12/1961 | D'Maragalaino | 264—175 |
| 3,021,567 | 2/1962 | Ranalli | 264—126 |
| 3,027,601 | 3/1962 | Barry | 264—127 |
| 3,039,137 | 6/1962 | Smith | 18—4 |
| 3,065,500 | 11/1962 | Berner | 264—126 |
| 3,067,469 | 12/1962 | Yarrison | 264—126 |
| 3,074,901 | 1/1963 | Lantos | 264—127 |
| 3,159,526 | 12/1964 | Hartesveldt | 161—261 |
| 3,164,650 | 1/1965 | Kocay | 264—165 |
| 3,184,525 | 5/1965 | Brandt | 264—127 |

OTHER REFERENCES

The New Fibers, J. V. Sherman, 1946, page 7 relied upon.

ROBERT F. WHITE, *Primary Examiner.*

R. B. MOFFITT, *Assistant Examiner.*